(12) United States Patent  
Yazawa (10) Patent No.: US 7,593,185 B2
(45) Date of Patent: Sep. 22, 2009

(54) PERPENDICULAR MAGNETIC RECORDING HEAD HAVING SPACER LAYER IN PREDETERMINED PORTION

(75) Inventor: Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 437 days.

(21) Appl. No.: 11/485,815

(22) Filed: Jul. 13, 2006

(65) Prior Publication Data

US 2007/0014049 A1    Jan. 18, 2007

(30) Foreign Application Priority Data

Jul. 15, 2005    (JP)    ............... 2005-206691

(51) Int. Cl.
  *G11B 5/33*    (2006.01)
(52) U.S. Cl. ............. 360/125.28; 360/125.12; 360/125.29
(58) Field of Classification Search ............ 360/125.27, 360/125.28, 125.29, 125.12, 125.08, 125.17, 360/125.26
See application file for complete search history.

(56) References Cited

U.S. PATENT DOCUMENTS

| 6,285,528 | B1 * | 9/2001 | Akiyama et al. ....... 360/125.27 |
| 7,394,620 | B2 * | 7/2008 | Taguchi .................. 360/125.03 |
| 2002/0080525 | A1 * | 6/2002 | Sato et al. ................ 360/126 |
| 2004/0004786 | A1 | 1/2004 | Shukh et al. | |
| 2004/0066574 | A1 * | 4/2004 | Crue et al. .................. 360/125 |

FOREIGN PATENT DOCUMENTS

| JP | 2001-250204 | 9/2001 |
| JP | 2003-303404 | 10/2003 |
| JP | 2005-100520 | 4/2005 |

OTHER PUBLICATIONS

Notification of Reasons for Refusal for corresponding Japanese Patent Application Serial No. 2005-206691, dated Jul. 10, 2007.

* cited by examiner

*Primary Examiner*—Jefferson Evans
(74) *Attorney, Agent, or Firm*—Brinks Hofer Gilson & Lione

(57) ABSTRACT

An auxiliary yoke layer is provided on a main magnetic pole layer with a spacer layer provided therebetween. A rear end of the auxiliary yoke layer and a rear end of a return yoke layer are connected to each other. At all times except during recording, the presence of the spacer layer breaks the magnetic connection between the main magnetic pole layer and the auxiliary yoke layer. On the other hand, a recording magnetic field having a magnetic field strength significantly higher than that of a disturbance magnetic field reaches the main magnetic pole layer through the spacer layer. Thereby, the adverse effect of the disturbance magnetic field is suppressed and the recording property is appropriately maintained.

6 Claims, 8 Drawing Sheets

PERPENDICULAR MAGNETIC RECORDING HEAD HAVING SPACER LAYER IN PREDETERMINED PORTION

This application claims the benefit of Japanese Patent Application No. 2005-206691 filed in Japan on Jul. 15, 2005, hereby incorporated by reference.

BACKGROUND

Field

Figure 11:
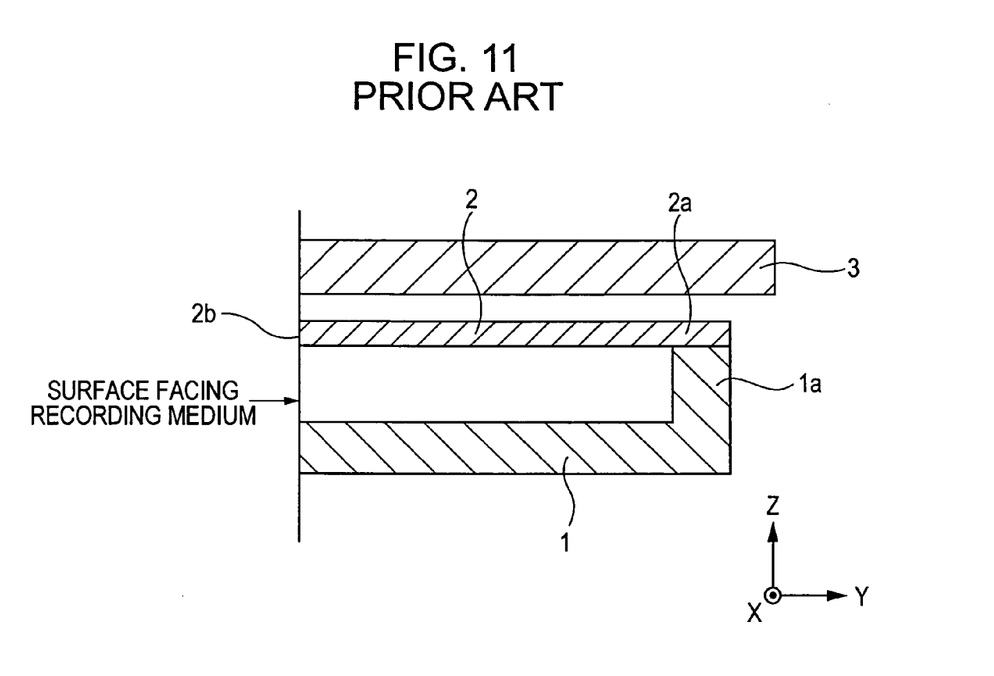
FIG. 11 is a partial cross-sectional view of a known perpendicular magnetic recording head.

A perpendicular magnetic recording head that records by applying a magnetic field in a direction perpendicular to the medium surface of a recording mediumRelated Art FIG. 11 is a schematic view of a known perpendicular magnetic recording head. FIG. 11 is a partial cross-sectional view of the perpendicular magnetic recording head cut in a direction parallel to a height direction (the Y direction in the figure) and parallel to a film thickness direction (the Z direction in the figure) from a surface of the magnetic recording head facing a recording medium.

As shown in FIG. 11, the perpendicular magnetic recording head includes a return yoke layer 1 and a main magnetic pole layer 2. A rear end 1a of the return yoke layer 1 is connected to a rear end 2a of the main magnetic pole layer 2. During recording, a magnetic circuit extending from the return yoke layer 1 to the main magnetic pole layer 2 is formed and a perpendicular magnetic field is applied from a leading end 2b of the surface of the main magnetic pole layer 2 to the recording medium. Thus, data is recorded on the recording medium in the perpendicular direction.

In FIG. 11, a shield layer 3 composed of a magnetic material is provided. The planar shape of the shield layer 3 is larger than that of the main magnetic pole layer 2. The shield layer 3 is not magnetically coupled with the main magnetic pole layer 2, and the shield layer 3 and the main magnetic pole layer 2 are separated by a nonmagnetic layer provided therebetween. The shield layer 3 has a function of absorbing a disturbance magnetic field at all times except during recording. Unless the shield layer 3 is provided, the disturbance magnetic field propagates from the leading end 2b of the main magnetic pole layer 2 to the recording medium, resulting in problems such as a deletion of data recorded on the recording medium and an attenuation of the magnetic field strength of the recording signals.

United States Patent Application No. 2004/0004786 A1 discloses a structure in which a spacer layer (spacer) 52 is provided between main magnetic pole sublayers (main poles) 38 in FIG. 2.

Unlike the perpendicular magnetic recording head shown in FIG. 11 or disclosed in the above patent document, in a perpendicular magnetic recording head including the return yoke layer 1 disposed above the main magnetic pole layer 2 (that is, disposed at the trailing side), the shield layer 3 is not provided and the return yoke layer 1 has a shielding function. The width in the X direction in the figure of the return yoke layer 1 is considerably larger than that of the main magnetic pole layer 2, and thus the return yoke layer 1 can have a shielding function covering the main magnetic pole layer 2.

However, in the case where the return yoke layer 1 has the shielding function, when the return yoke layer 1 absorbs the disturbance magnetic field, the disturbance magnetic field is led to the main magnetic pole layer 2 connected to the return yoke layer 1. Therefore, the adverse effect of the disturbance magnetic field cannot be appropriately reduced.

Referring to FIG. 2 of United States Patent Application No. 2004/0004786 A1, the main pole layer is divided into two sublayers and a spacer layer is provided therebetween. Even in this structure, since a magnetic underlayer 54 shown in FIG. 2 is connected to a return yoke layer 40, the disturbance magnetic field absorbed by the return yoke layer 40 is led to the magnetic underlayer 54. Therefore, the adverse effect of the disturbance magnetic field cannot be effectively and appropriately reduced.

SUMMARY

A perpendicular magnetic recording head includes a main magnetic pole layer composed of a magnetic material. A return yoke layer is composed of a magnetic material that faces the main magnetic pole layer with a nonmagnetic gap layer provided therebetween. The gap layer is provided at the surface of the magnetic recording head facing a recording medium and at the trailing side of the main magnetic pole layer. Coil layers provide the main magnetic pole layer and the return yoke layer with a recording magnetic field. A nonmagnetic spacer layer is provided at least between a rear end of the main magnetic pole layer and a rear end of the return yoke layer. The rear ends are disposed away from the surface of the magnetic recording head facing the recording medium in a height direction.

The spacer layer functions as a layer that suppresses a phenomenon that a disturbance magnetic field absorbed by the return yoke layer is led from the return yoke layer to the main magnetic pole layer at all times except during recording. By forming the spacer layer, a magnetic connection between the main magnetic pole layer and the return yoke layer can be suppressed at all times except during recording. Even when the disturbance magnetic field is absorbed by the return yoke layer, the magnetic field is not led to the main magnetic pole layer. This arrangement allows the main magnetic pole layer that may sometimes delete data recorded on a recording medium with the disturbance magnetic field or problems of the like can be suppressed.

Since a recording magnetic field is significantly larger than the disturbance magnetic field, the recording magnetic field can pass through the spacer layer without a significant attenuation and is sent to the main magnetic pole layer while maintaining a high magnetic field strength. Data can be appropriately recorded on the recording medium without significantly decreasing the strength of the recording magnetic field propagating from the main magnetic pole layer to the recording medium, compared with known structures.

As described above, the adverse effect of the disturbance magnetic field can be suppressed and the recording property can be appropriately maintained.

An auxiliary yoke layer is preferably provided between the main magnetic pole layer and the return yoke layer. A rear end of the auxiliary yoke layer is preferably connected to the rear end of the return yoke layer and the spacer layer is preferably provided between the auxiliary yoke layer and the main magnetic pole layer. When the main magnetic pole layer faces the auxiliary yoke layer having a large area with the spacer layer provided therebetween, the recording magnetic field flows from the auxiliary yoke layer to the main magnetic pole layer over a wide area. For example, the attenuation of the recording magnetic field caused by the formation of the spacer layer can be appropriately suppressed and the recording property can be maintained more effectively.

A thin-film magnetic layer composed of a magnetic material and having a thickness smaller than that of the main magnetic pole layer may be connected to the return yoke layer at the surface of the magnetic recording head facing the recording medium and at the rear end of the return yoke layer, and the spacer layer may be provided between the thin-film magnetic layer and the main magnetic pole layer.

By forming a magnetic structure integrated by the return yoke layer and the thin-film magnetic layer, the disturbance magnetic field can be efficiently absorbed, the flow of the disturbance magnetic field to the main magnetic pole layer can be suppressed more appropriately, and the adverse effect of the disturbance magnetic field can be suppressed more effectively.

The thickness of the thin-film magnetic layer is smaller than that of the main magnetic pole layer. When a recording magnetic field having a magnetic field strength significantly higher than that of the disturbance magnetic field is led to the thin-film magnetic layer, the thin-film magnetic layer reaches magnetic saturation. The recording magnetic field is led from the thin-film magnetic layer to the main magnetic pole layer. The recording magnetic field can be appropriately led to the main magnetic pole layer without a significant attenuation, and thus the recording property can be appropriately maintained.

The thin-film magnetic layer is preferably composed of a magnetic material having a saturation magnetic flux density lower than that of the main magnetic pole layer because the thin-film magnetic layer can appropriately reach magnetic saturation during recording.

Preferably, the spacer layer extends to the surface of the magnetic recording head facing the recording medium and also functions as the gap layer. For example, a perpendicular magnetic recording head that has a simple structure can be provided.

A nonmagnetic spacer layer is provided between the rear end of the main magnetic pole layer and the rear end of the return yoke layer. The spacer layer functions as a layer that suppresses a phenomenon that a disturbance magnetic field absorbed by the return yoke layer is led from the return yoke layer to the main magnetic pole layer at all times except during recording. By forming the spacer layer, a magnetic connection between the main magnetic pole layer and the return yoke layer can be suppressed at all times except during recording. Even when the disturbance magnetic field is absorbed by the return yoke layer, the magnetic field is not led to the main magnetic pole layer. For example, a problem that the main magnetic pole layer may sometimes delete data recorded on a recording medium with the disturbance magnetic field or problems of the like can be suppressed.

In contrast, since a recording magnetic field is significantly larger than the disturbance magnetic field, the recording magnetic field can pass through the spacer layer without a significant attenuation and is sent to the main magnetic pole layer while maintaining a high magnetic field strength. Data can be appropriately recorded on the recording medium without significantly decreasing the strength of the recording magnetic field propagating from the main magnetic pole layer to the recording medium, compared with known structures.

As described above, the adverse effect of the disturbance magnetic field can be suppressed and the recording property can be appropriately maintained.

DESCRIPTION

In the figures, the X direction represents a track width direction, the Y direction represents a height direction, and the Z direction represents a moving direction of a recording medium. Each direction is orthogonal to the other two directions. The X-Z plane is a plane parallel to a surface H1a of the magnetic recording head facing the recording medium.

Figure 1:
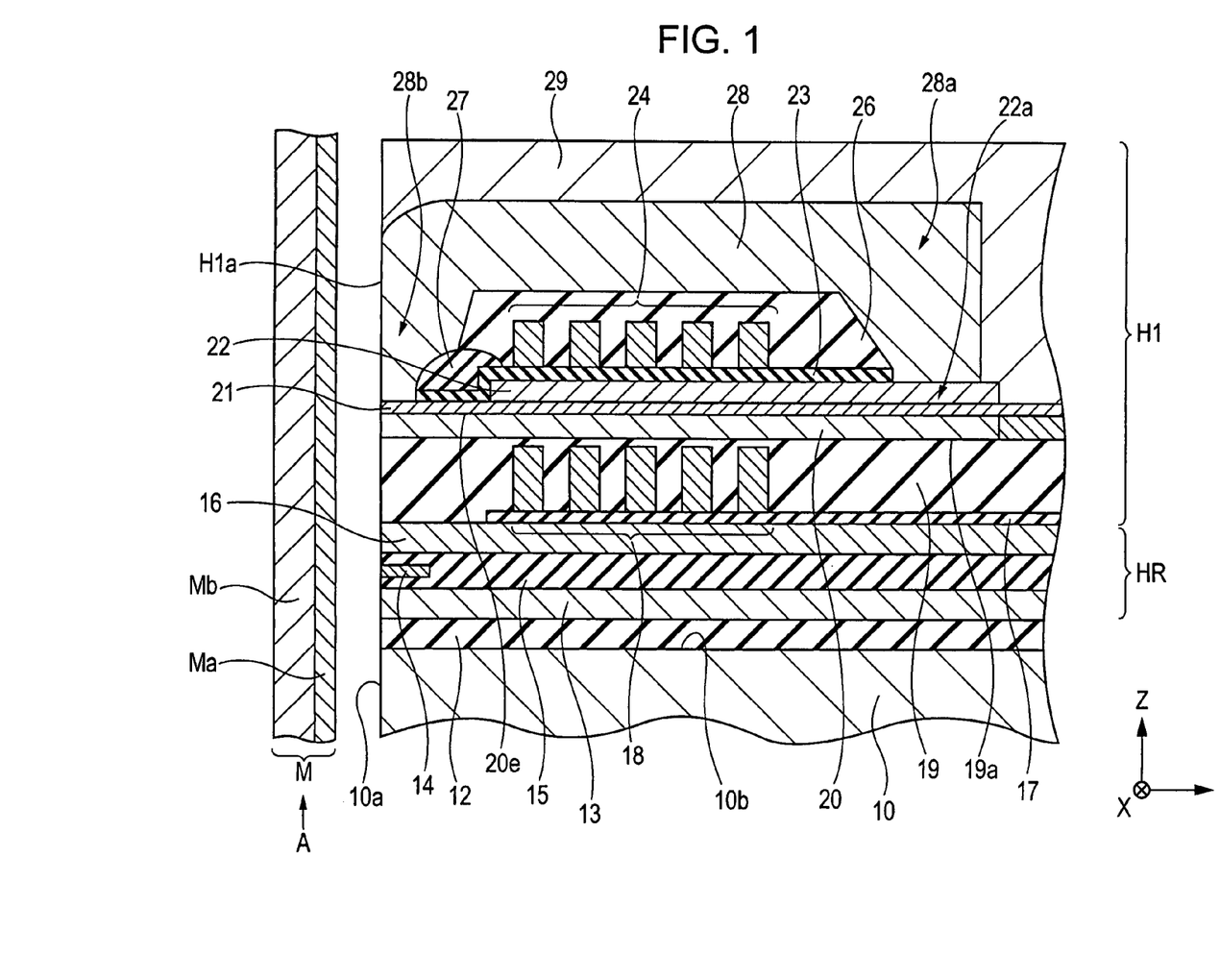
FIG. 1 is a partial cross-sectional view of a composite magnetic head according to a first embodiment.

A perpendicular magnetic recording head H1 shown in FIG. 1 provides a recording medium M with a perpendicular magnetic field to magnetize a hard film Ma of the recording medium M in the perpendicular direction.

The recording medium M has, for example, a disc shape. The hard film Ma has a high residual magnetization is provided on the surface of the recording medium M. A soft film Mb has a high magnetic permeability is provided inside the recording medium M. The recording medium M is rotated around the center of the disc.

A slider 10 is composed of a nonmagnetic material such as $Al_2O_3$—TiC. When a surface 10a of the slider 10 faces the recording medium M and the recording medium M is rotated, the slider 10 is floated above the surface of the recording medium M by an airflow passing over the surface or the slider 10 is slid over the recording medium M. In FIG. 1, the moving direction of the recording medium M relative to the slider 10 is the A direction (the direction shown by arrow A in the figure). The A direction is also a direction of an airflow. Upstream of the airflow, that is, the lower direction in FIG. 1 (the direction opposite to the Z direction in the figure) is a reading side. Downstream of the airflow, that is, the upper direction in FIG. 1 (the Z direction in the figure) is a trailing side.

A nonmagnetic insulating layer 12 composed of an inorganic material such as $Al_2O_3$ or $SiO_2$ is provided on an end face (top face) 10b of the slider 10, the end face 10b being disposed at the trailing side of the slider 10. A reading section HR is provided on the nonmagnetic insulating layer 12.

The reading section HR includes a lower shield layer 13, an upper shield layer 16, a nonmagnetic insulating layer (gap insulating layer) 15 provided between the lower shield layer 13 and the upper shield layer 16, and a reading element 14 provided in the nonmagnetic insulating layer 15. The reading element 14 is a magnetoresistive element such as an anisotropic magnetoresistive (AMR) element, a giant magnetoresistive (GMR) element, or a tunnel magnetoresistive (TMR) element.

A plurality of lower coil layers 18 composed of a conductive material is provided on the upper shield layer 16, with a coil-insulating underlayer 17 provided therebetween. The lower coil layers 18 are composed of, for example, at least one nonmagnetic metal selected from Au, Ag, Pt, Cu, Cr, Al, Ti, NiP, Mo, Pd, and Rh. Alternatively, the lower coil layers 18 may have a layered structure produced by laminating these nonmagnetic metals.

A coil-insulating layer 19 composed of an inorganic insulating material such as $Al_2O_3$ or an organic insulating material such as a resist is provided around the lower coil layers 18.

The top face 19a of the coil-insulating layer 19 is planarized. A main magnetic pole layer 20 is provided on the top face 19a. The main magnetic pole layer 20 extends from the surface H1a of the magnetic recording head facing the recording medium (hereinafter, simply referred to as surface H1a) in the height direction (the Y direction in the figure) so as to have a predetermined length. The width in the track width direction (the X direction in the figure) of the main magnetic pole layer 20 is equal to a track width Tw and the width at the rear end thereof is larger than the track width Tw (see FIG. 4). The main magnetic pole layer 20 is formed by plating a ferromagnetic material. The main magnetic pole layer 20 is composed of a material having a high saturation magnetic flux density, such as Ni—Fe, Co—Fe, or Ni—Fe—Co.

A nonmagnetic spacer layer 21 is provided on a top face (end face being disposed at the trailing side) 20e of the main magnetic pole layer 20. An auxiliary yoke layer 22 is provided on the spacer layer 21. The auxiliary yoke layer 22 is disposed from a position receding from the surface H1a in the height direction (the Y direction in the figure) and extends in the height direction.

Another coil-insulating underlayer 23 is provided on the spacer layer 21 and the auxiliary yoke layer 22. A plurality of upper coil layers 24 composed of a conductive material is provided on the coil-insulating underlayer 23. The upper coil layers 24 are composed of at least one nonmagnetic metal selected from Au, Ag, Pt, Cu, Cr, Al, Ti, NiP, Mo, Pd, and Rh as well as the lower coil layers 18. Alternatively, the upper coil layers 24 may have a layered structure produced by laminating these nonmagnetic metals.

The lower coil layers 18 and the upper coil layers 24 are electrically connected so that the ends of the layers in the track width direction (the X direction in the figure) are wound around the main magnetic pole layer 20 and the auxiliary yoke layer 22.

Another coil-insulating layer 26 composed of an inorganic insulating material such as $Al_2O_3$ or an organic insulating material such as a resist is provided around the upper coil layers 24.

In addition, a gap depth (Gd) determining layer 27 is provided on a part of the spacer layer 21, the part being nearer to the surface H1a than the upper coil layers 24. The Gd determining layer 27 may be composed of either an organic insulating material or an inorganic insulating material. The Gd determining layer 27 is provided at a position distant from the surface H1a in the height direction (the Y direction in the figure). The formation of the Gd determining layer 27 is not essential.

As shown in FIG. 1, a return yoke layer 28 is provided on the coil-insulating layer 26, the Gd determining layer 27, and the spacer layer 21 that is disposed at the front of the Gd determining layer 27, for example, at the side of the surface H1a. A rear end 28a of the return yoke layer 28, which is away from the surface H1a in the height direction (the Y direction in the figure), is connected to a rear end 22a of the auxiliary yoke layer 22. A leading end 28b of the return yoke layer 28 adjacent to the surface H1a faces the main magnetic pole layer 20, with the spacer layer 21 provided therebetween. The spacer layer 21 at the surface H1a functions as a magnetic gap between the return yoke layer 28 and the main magnetic pole layer 20.

As shown in FIG. 1, a protective layer 29 composed of $Al_2O_3$ or the like is provided on the return yoke layer 28.

Figure 6:
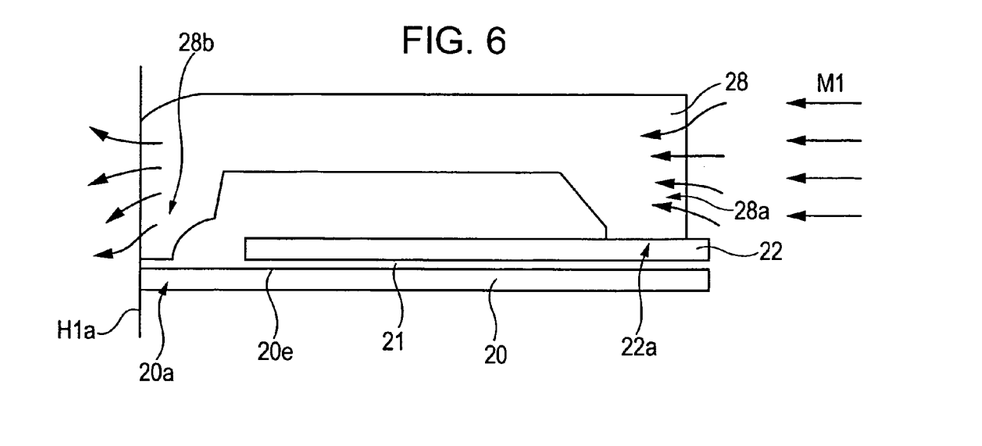
FIG. 6 is a partial schematic view of a return yoke layer, a main magnetic pole layer, and an auxiliary yoke layer of the perpendicular magnetic recording head shown in FIG. 1.

The perpendicular magnetic recording head H1 shown in FIG. 1 will be described. As shown in FIG. 6, the auxiliary yoke layer 22 is provided on the top face (end face being disposed at the trailing side) 20e of the main magnetic pole layer 20, with the spacer layer 21 provided therebetween. The rear end 22a of the auxiliary yoke layer 22 is connected to the rear end 28a of the return yoke layer 28. At the surface H1a, the leading end 28b of the return yoke layer 28 faces a leading end 20a of the main magnetic pole layer 20, with the spacer layer 21 provided therebetween.

As shown in FIG. 6, in the case where the spacer layer 21 is provided, at all times except during recording, a disturbance magnetic field M1 efficiently absorbed by the return yoke layer 28 does not reach the main magnetic pole layer 20 provided on the spacer layer 21, compared with known structures. Thus, the formation of the spacer layer 21 can break the magnetic connection between the main magnetic pole layer 20 and the auxiliary yoke layer 22.

Figure 7:
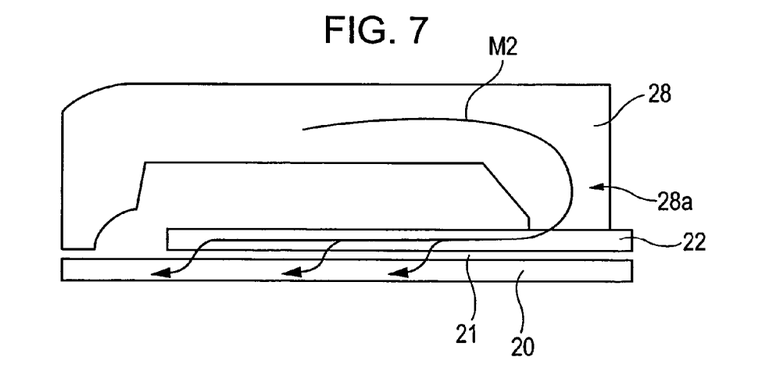
FIG. 7 is a partial schematic view of the return yoke layer, the main magnetic pole layer, and the auxiliary yoke layer of the perpendicular magnetic recording head shown in FIG. 1.

On the other hand, referring to FIG. 7, when a recording magnetic field M2 generated from the coil layers 18 and 24 shown in FIG. 1 enters the return yoke layer 28, the recording magnetic field M2 is first led to the auxiliary yoke layer 22 connected to the rear end 28a of the return yoke layer 28. The arrows in FIG. 7 schematically show a flow of the recording magnetic field M2.

The magnetic field strength of the recording magnetic field M2 is significantly larger than that of the disturbance magnetic field, for example, several hundreds times (specifically, about 100 to 200 times). The recording magnetic field M2 extends from the auxiliary yoke layer 22 to the main magnetic pole layer 20 through the spacer layer 21 without a significant attenuation. For example, a magnetic circuit passing through the return yoke layer 28, the auxiliary yoke layer 22, the spacer layer 21, and the main magnetic pole layer 20, in that order is formed during recording.

The spacer layer 21 functions as a magnetic-circuit-switching layer, which provides a magnetic circuit during recording and changes the magnetic circuit when not recording. When not recording, the spacer layer 21 suppresses the formation of the magnetic circuit connecting the auxiliary yoke layer 22 to the main magnetic pole layer 20. During recording, the spacer layer 21 allows the magnetic circuit connecting the auxiliary yoke layer 22 to the main magnetic pole layer 20 to be formed.

The spacer layer 21 must be nonmagnetic. The spacer layer 21 may be either insulating or conductive as long as the spacer layer 21 is nonmagnetic. The spacer layer 21 is composed of one component or a mixture containing at least two or more components selected from $Al_2O_3$, $SiO_2$, Ti, Ru, Pd, Ta, and Au. The spacer layer 21 may have a single-layer structure or a multilayer structure.

The thickness of the spacer layer 21 is preferably in the range of about 30 to 500 nm. When the thickness of the spacer layer 21 is in the range of about 30 to 80 nm, the spacer layer 21 can also function as a gap layer. Thereby, at all times except during recording, a phenomenon that the effect of the disturbance magnetic field M1 extends from the auxiliary yoke layer 22 to the main magnetic pole layer 20 can be adequately suppressed. On the other hand, during recording, the recording magnetic field M2 can extend from the auxiliary yoke layer 22 to the main magnetic pole layer 20 without a significant attenuation while maintaining a high magnetic field strength.

Figure 4:
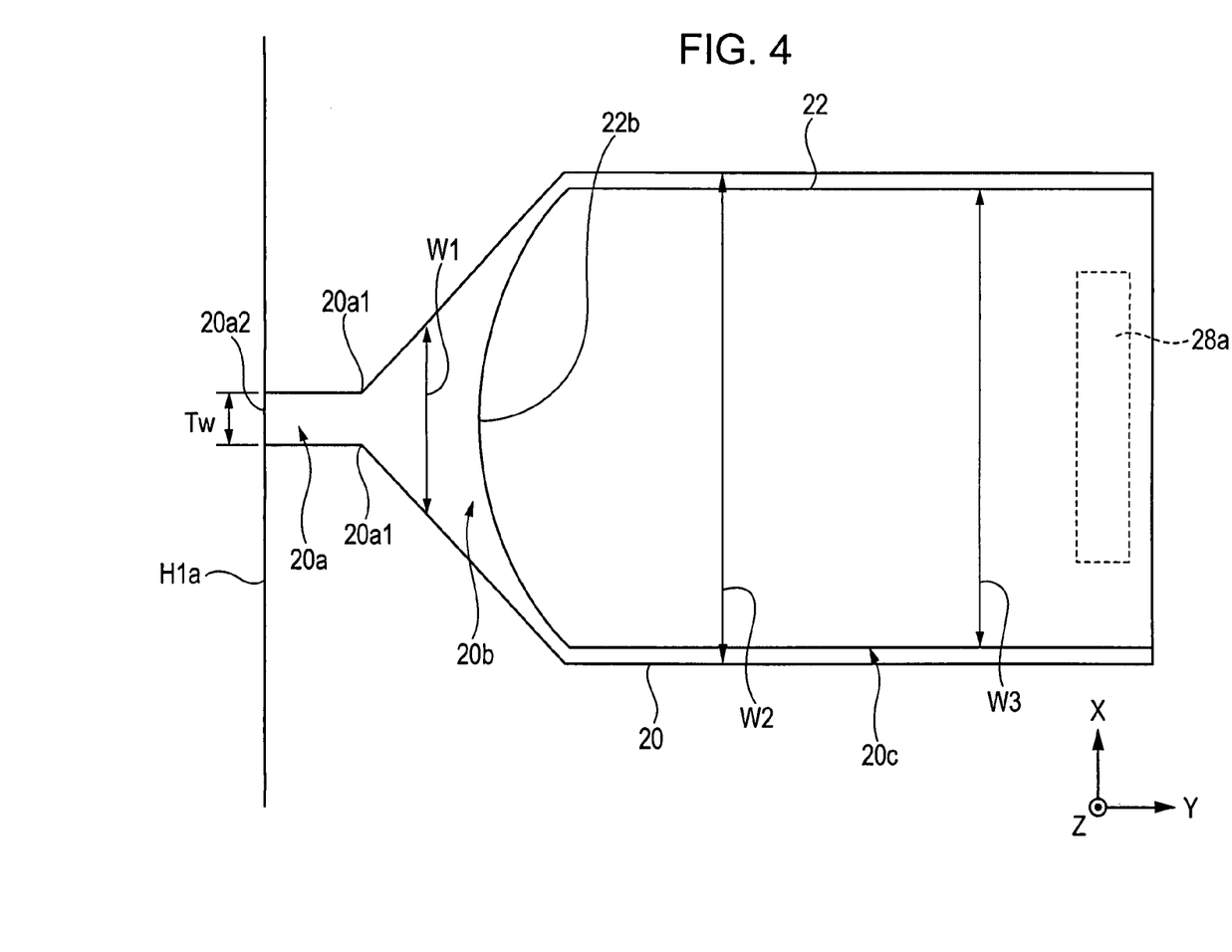
FIG. 4 is a partial plan view of the perpendicular magnetic recording head shown in FIG. 1.

As shown in FIG. 4, the auxiliary yoke layer 22 and the main magnetic pole layer 20 face each other over a large area, with the spacer layer provided therebetween. The main magnetic pole layer 20 includes a leading end 20a, a height-side end 20a1 of the leading end 20a, a middle part 20b, and a rear end 20c. The leading end 20a extends from the surface H1a in the height direction (the Y direction in the figure) and has a width of the track width Tw. In the middle part 20b, a width W1 in the track width direction (the X direction in the figure) gradually increases from the height-side end 20a1 in the height direction (the Y direction in the figure). The rear end 20c is disposed adjacent to the middle part 20b in the height direction (the Y direction in the figure) and substantially has a certain width W2 in the track width direction (the X direction in the figure).

The planar shape of the main magnetic pole layer 20 is not limited to the planar shape shown in FIG. 4. For example, the width of the leading end 20a may gradually increase in the height direction. The main magnetic pole layer 20 may not include the rear end 20c and may include only the leading end 20a and the middle part 20b. In the main magnetic pole layer 20 shown in FIG. 4, the area of an end face 20a2 of the leading end 20a exposed on the surface H1a is significantly smaller than the area of the corresponding end face of the return yoke layer 28. This structure can concentrate the recording magnetic field on the leading end 20a of the main magnetic pole layer 20, and thus the recording magnetic field with a high magnetic field strength can propagate to the recording medium.

As shown in FIG. 4, the auxiliary yoke layer 22 is provided above the main magnetic pole layer 20 and extends from the middle part 20b to the rear end 20c of the main magnetic pole layer 20. An end face 22b of the auxiliary yoke layer 22 adjacent to the surface H1a is disposed away from the surface H1a in the height direction (the Y direction in the figure). The end face 22b has a convexly curved shape in which the width in the track width direction gradually increases in the height direction, but the shape of the end face 22b is not limited thereto. The auxiliary yoke layer 22 substantially has a certain width W3 in the track width direction (the X direction in the figure) at an area away from the end face 22b thereof in the height direction (the Y direction in the figure), but the planar shape of the auxiliary yoke layer 22 is not limited thereto. In this embodiments the width W3 of the auxiliary yoke layer 22 is smaller than the width W2 of the rear end 20c of the main magnetic pole layer 20. The width W3 may be larger than the width W2 or the width W3 may be the same as the width W2.

This embodiment also includes a magnetic head not including the auxiliary yoke layer 22. For example, since the main magnetic pole layer 20 faces the rear end 28a of the return yoke layer 28, with the spacer layer 21 provided therebetween, the main magnetic pole layer 20 receives the recording magnetic field M2 from the rear end 28a of the return yoke layer 28. The area of the rear end 28a facing the main magnetic pole layer 20 is small, for example, only the area shown by the dotted line in FIG. 4. The attenuation of the magnetic field strength of the recording magnetic field M2 caused by the formation of the spacer layer 21 is easily increased.

In the embodiment shown in FIGS. 1 and 4, since the auxiliary yoke layer 22 is connected to the rear end 28a of the return yoke layer 28, the recording magnetic field M2 is led from the return yoke layer 28 to the auxiliary yoke layer 22. Since the area of the auxiliary yoke layer 22 facing the main magnetic pole layer 20 is very large, the recording magnetic field M2 flows from the auxiliary yoke layer 22 to the main magnetic pole layer 20 over a wide area. Consequently, the attenuation of the recording magnetic field M2 caused by the formation of the spacer layer 21 can be more appropriately suppressed, and thus a satisfactory recording property can be maintained.

The specific structure of the embodiment shown in FIG. 1 will now be described. The main magnetic pole layer 20 is composed of $Fe_{80}Co_5Ni_{15}$ and has a thickness of 300 nm. The spacer layer 21 is composed of $Al_2O_3$ and has a thickness of 50 nm. The auxiliary yoke layer 22 is composed of $Ni_{81}Fe_{19}$ and has a thickness of 300 nm. Each of the widths of the main magnetic pole layer 20 and the auxiliary yoke layer 22 is 10 µm or less. The magnetic field strength of the recording magnetic field M2 is, for example, about 10 kOe (=about 790 kA/m) at the leading end of the magnetic pole and the magnetic field strength of the disturbance magnetic field M1 is, for example, in the range of about 0 to 200 Oe (=about 0 to 15,800 A/m).

In the embodiment shown in FIG. 1, the spacer layer 21 is provided between the auxiliary yoke layer 22 and the main magnetic pole layer 20 and, in addition, between the leading end 28b of the return yoke layer 28 and the main magnetic pole layer 20 at the side of the surface H1a. The spacer layer 21 functions as a magnetic gap at the surface H1a. In the embodiment shown in FIG. 1, the spacer layer 21 functions as a magnetic gap and a magnetic gap layer need not be separately formed in addition to the spacer layer 21. A perpendicular magnetic recording head has an excellent recording property and is capable of suppressing the adverse effect of the disturbance magnetic field can be realized with a simple structure.

In the embodiment shown in FIG. 1, the thickness of the spacer layer 21 at the area functioning as the magnetic gap is the same as that at the other area. The thickness of the spacer layer 21 may not be uniform.

Figure 10:
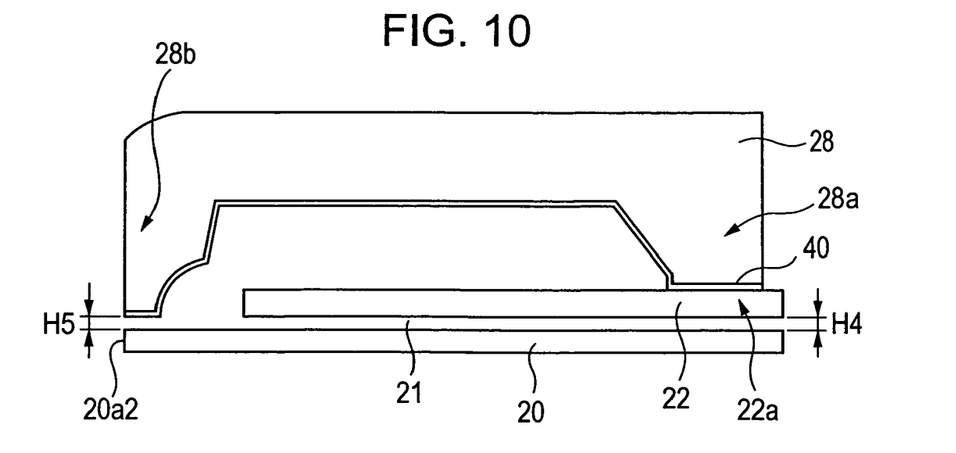
FIG. 10 is a partial enlarged view of the return yoke layer, the main magnetic pole layer, and the auxiliary yoke layer of the perpendicular magnetic recording head shown in FIG. 1.

Referring to FIG. 10, a thickness H4 shows the thickness of the spacer layer 21 disposed between the auxiliary yoke layer 22 and the main magnetic pole layer 20. A thickness H5 shows the thickness of the spacer layer 21 disposed between the leading end 28b of the return yoke layer 28 and the main magnetic pole layer 20, that is, the thickness of the spacer layer 21 at the part functioning as the magnetic gap. The thickness H4 and the thickness H5 of the spacer layer 21 may be the same or different. When the thickness H4 is different from the thickness H5, preferably, the thickness H5 of the spacer layer 21 at the part functioning as the magnetic gap is smaller than the thickness H4 of the spacer layer 21 disposed between the auxiliary yoke layer 22 and the main magnetic pole layer 20.

During recording, the main magnetic pole layer 20 and the return yoke layer 28 are close to each other at the part of the magnetic gap. The magnetic field distribution of the perpendicular recording magnetic field can be optimized and data can be efficiently recorded on the recording medium. When the thickness H4 of the spacer layer 21 is smaller than the thickness H5 thereof, the magnetic separation between the auxiliary yoke layer 22 and the main magnetic pole layer 20 is insufficient. It is difficult to appropriately suppress the adverse effect of the disturbance magnetic field.

The thickness H4 of the spacer layer 21 disposed between the main magnetic pole layer 20 and the auxiliary yoke layer 22 is larger than the thickness of a nonmagnetic layer (hereinafter referred to as nonmagnetic plating base layer) 40, which is included in a plating base layer. The plating base layer is required when the return yoke layer 28 is formed by plating on the rear end 22*a* of the auxiliary yoke layer 22. Since the thickness of the nonmagnetic plating base layer 40 is very small (specifically, about 5 nm), the disturbance magnetic field passes through the nonmagnetic plating base layer 40. For example, the nonmagnetic plating base layer 40 does not have a function of blocking the disturbance magnetic field. On the other hand, the spacer layer 21 of this embodiment has a thickness larger than that of the nonmagnetic plating base layer 40, and thus has a function of blocking the disturbance magnetic field.

The thickness H4 of the spacer layer 21 has been described with comparison with the thickness of the nonmagnetic plating base layer 40 provided between the rear end 22*a* of the auxiliary yoke layer 22 and the rear end 28*a* of the return yoke layer 28. The nonmagnetic plating base layer to be compared is not particularly limited as long as the magnetic layers are connected to each other, with the nonmagnetic plating base layer provided therebetween, and the nonmagnetic plating base layer is disposed at a position forming a magnetic circuit for the disturbance magnetic field and the recording magnetic field.

Nonmagnetic plating base layers are not significantly different from each other at any position and each have a very small thickness. The plating base layer is composed of a magnetic layer instead of a nonmagnetic layer in some cases (in such a case, the thickness of the nonmagnetic plating base layer is zero). For example, in FIG. 2 described below, a nonmagnetic plating base layer provided between a thin-film magnetic layer 30 and an auxiliary yoke layer 22, and another nonmagnetic plating base layer provided between the auxiliary yoke layer 22 and a rear end 28*a* of a return yoke layer 28 correspond to the nonmagnetic plating base layer.

This embodiment does not exclude the case where the spacer layer 21 is used as a plating base layer that forms the auxiliary yoke layer 22 by plating.

Figure 2:
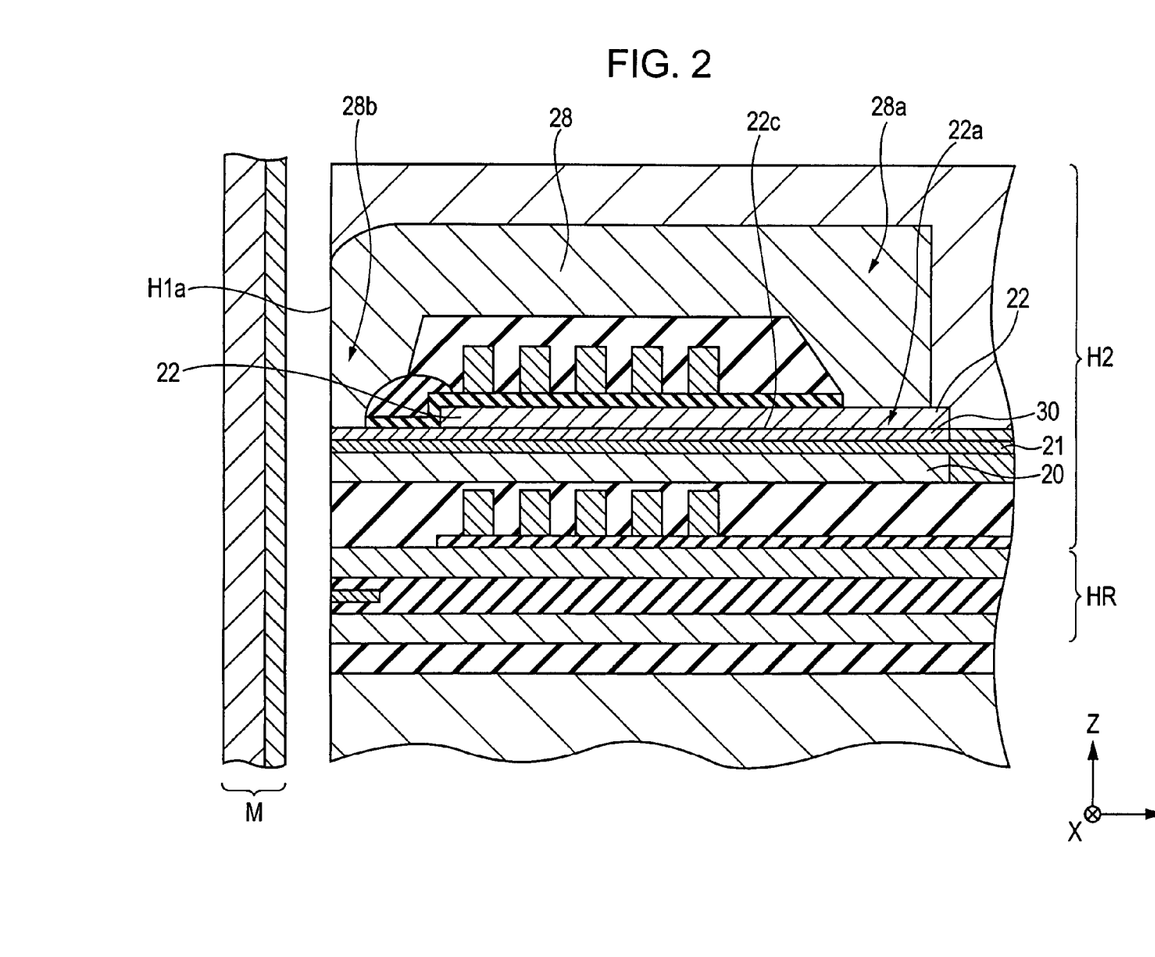
FIG. 2 is a partial cross-sectional view of a composite magnetic head according to a second embodiment.

According to a perpendicular magnetic recording head H2 of a second embodiment shown in FIG. 2, unlike the recording head H1 shown in FIG. 1, the thin-film magnetic layer 30 having a thickness smaller than the thickness of a main magnetic pole layer 20 is connected to a bottom face (end face being disposed at the reading side) 22*c* of the auxiliary yoke layer 22. The thin-film magnetic layer 30 is also connected to the bottom face of a leading end 28*b* of the return yoke layer 28. The main magnetic pole layer 20 is provided under the thin-film magnetic layer 30, with a nonmagnetic spacer layer 21 provided therebetween.

The thin-film magnetic layer 30 is composed of a magnetic material having a saturation magnetic flux density lower than that of the main magnetic pole layer 20. More preferably, the thin-film magnetic layer 30 is composed of a magnetic material having a magnetic permeability higher than that of the main magnetic pole layer 20. The thin-film magnetic layer 30 is composed of one component or a mixture of $Ni_{81}Fe_{19}$ and $Co_{70}Fe_{20}Ni_{10}$. The thin-film magnetic layer 30 may have a single-layer structure or a multilayer structure.

As described above, the thin-film magnetic layer 30 is formed so that the thickness thereof is smaller than that of the main magnetic pole layer 20. The thin-film magnetic layer 30 preferably has a thickness of about 10 nm (in the range of about 5 to 20 nm).

Figure 8:
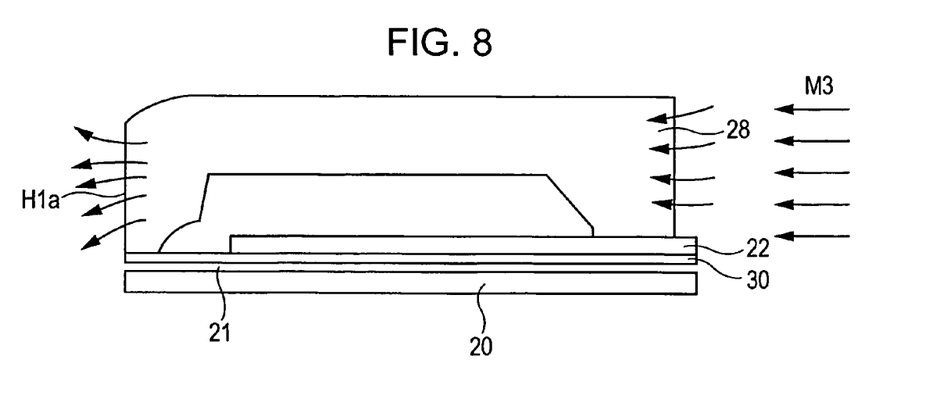
FIG. 8 is a partial schematic view of a return yoke layer, a main magnetic pole layer, and an auxiliary yoke layer of the perpendicular magnetic recording head shown in FIG. 2.

The thin-film magnetic layer 30 connects the auxiliary yoke layer 22 to the return yoke layer 28. At all times except during recording, a closed magnetic circuit passing through the return yoke layer 28, the auxiliary yoke layer 22, and the thin-film magnetic layer 30 is formed. As shown in FIG. 8, when a disturbance magnetic field M3 is absorbed by the return yoke layer 28, the disturbance magnetic field M3 is efficiently absorbed by a magnetic structure composed of the return yoke layer 28, the auxiliary yoke layer 22, and the thin-film magnetic layer 30. The effect of the disturbance magnetic field M3 does not easily reach the main magnetic pole layer 20 through the spacer layer 21.

Figure 9:
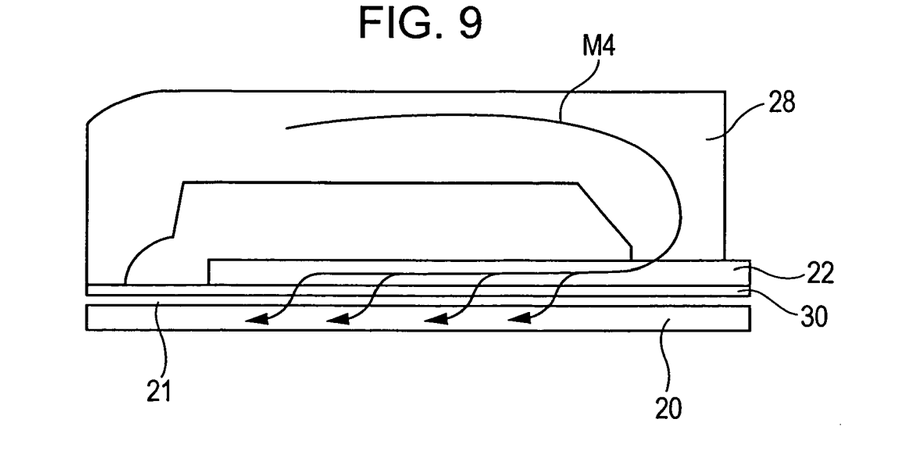
FIG. 9 is a partial schematic view of the return yoke layer, the main magnetic pole layer, and the auxiliary yoke layer of the perpendicular magnetic recording head shown in FIG. 2.

As described above, the thickness of the thin-film magnetic layer 30 is smaller than that of the main magnetic pole layer 20. The thin-film magnetic layer 30 is preferably composed of a magnetic material having a low saturation magnetic flux density and a high magnetic permeability compared with those of the main magnetic pole layer 20. Therefore, when a recording magnetic field having a high magnetic field strength several hundreds times that of the disturbance magnetic field is led from the return yoke layer 28 to the thin-film magnetic layer 30 through the auxiliary yoke layer 22, the thin-film magnetic layer 30 reaches magnetic saturation. When the thin-film magnetic layer 30 reaches magnetic saturation, as shown in FIG. 9, the recording magnetic field M4 is led from the thin-film magnetic layer 30 to the main magnetic pole layer 20 through the spacer layer 21.

The thin-film magnetic layer 30 functions as a magnetic-circuit-switching layer, which provides a magnetic circuit during recording and changes the magnetic circuit when not recording, together with the spacer layer 21. When not recording, since the thin-film magnetic layer 30 does not reach magnetic saturation, the thin-film magnetic layer 30 allows the closed magnetic circuit for the disturbance magnetic field M3 to be formed.

During recording, the thin-film magnetic layer 30 reaches magnetic saturation, and allows the magnetic circuit connecting the auxiliary yoke layer 22 to the main magnetic pole layer 20 to be formed. Even if the thin-film magnetic layer 30 reaches magnetic saturation by the disturbance magnetic field M3 at all times except during recording, a phenomenon that the disturbance magnetic field M3, which is significantly lower than the recording magnetic field M4, reaches the main magnetic pole layer 20 through the spacer layer 21 can be suppressed because of the effect of the formation of the spacer layer 21. Therefore, the adverse effect of the disturbance magnetic field can be suppressed, compared with known structures.

Figure 5:
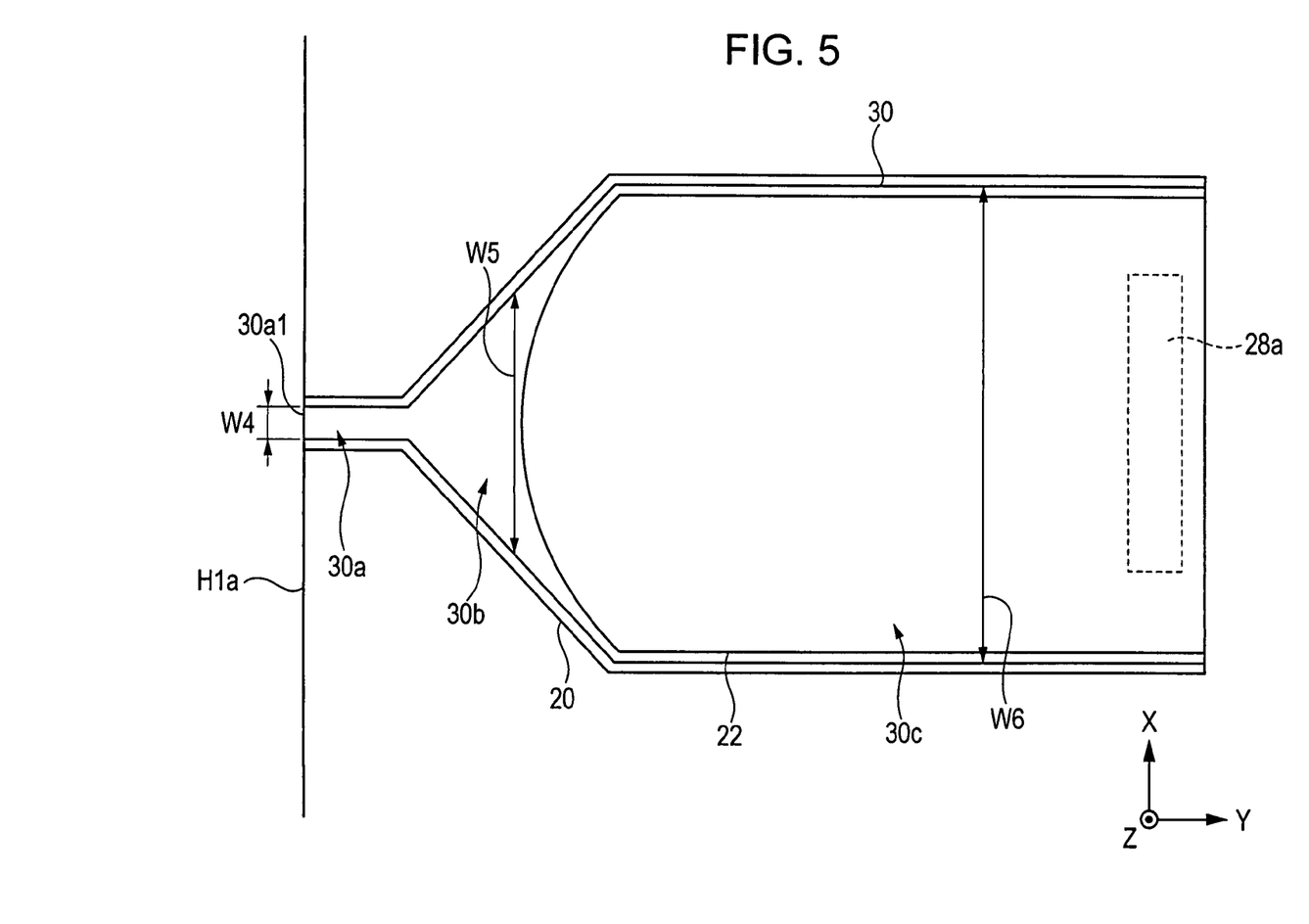
FIG. 5 is a partial plan view of the perpendicular magnetic recording head shown in FIG. 2.

As shown in FIG. 5, the planar shape of the thin-film magnetic layer 30 is slightly smaller than that of the main magnetic pole layer 20, but is not limited thereto. The planar shape of the thin-film magnetic layer 30 may be larger than that of the main magnetic pole layer 20. The thin-film magnetic layer 30 includes a leading end 30*a*, a middle part 30*b*, and a rear end 30*c* as well as the main magnetic pole layer 20. The leading end 30*a* has a small width W4 in the track width direction (the X direction in the figure). The middle part 30*b* has a width W5 that gradually increases in the height direction. The rear end 30*c* is disposed adjacent to the middle part 30*b* in the height direction (the Y direction in the figure), and substantially has a certain width W6 in the track width direction (the X direction in the figure). The shape of the thin-film magnetic layer 30 is not limited to the above. In this embodiment, an end face 30*a*1 of the leading end 30*a* corresponds to the surface H1*a*.

The end face 30*a*1 may be slightly shifted from the surface H1*a* in the height direction (the Y direction in the figure) as long as the leading end 30*a* of the thin-film magnetic layer 30 is connected to the bottom face of the leading end 28*b* of the return yoke layer 28. When the end face 30*a*1 of the thin-film magnetic layer 30 is slightly shifted in the height direction (the Y direction in the figure), preferably, a possibility of releasing an unexpected magnetic field from the thin-film magnetic layer 30 to a recording medium M can be suppressed.

In the case where the planar shape of the thin-film magnetic layer 30 is excessively large, even when the thin-film magnetic layer 30 receives the recording magnetic field M4 having a high magnetic field strength, the thin-film magnetic layer 30 does not easily reach magnetic saturation effectively. Preferably, the planar shape of the thin-film magnetic layer 30 is substantially the same size as that of the main magnetic pole layer 20, or the planar shape of the thin-film magnetic layer 30 is smaller than that of the main magnetic pole layer 20.

The specific structure of the embodiment shown in FIG. 2 will now be described. The main magnetic pole layer 20 is composed of $Fe_{80}Co_5Ni_{15}$ and has a thickness of about 300 nm. The spacer layer 21 is composed of $Al_2O_3$ and has a thickness of 50 nm. The auxiliary yoke layer 22 is composed of $Ni_{81}Fe_{19}$ and has a thickness of 300 nm. Each of the widths of the main magnetic pole layer 20 and the auxiliary yoke layer 22 is 10 μm or less. The magnetic field strength of the recording magnetic field M4 is, for example, about 10 kOe (=about 790 kA/m) at the leading end of the magnetic pole and the magnetic field strength of the disturbance magnetic field M3 is, for example, in the range of about 0 to 200 Oe (=about 0 to 15,800 A/m). The thin-film magnetic layer 30 is composed of $Ni_{81}Fe_{19}$ and has a thickness of 10 nm. The thin-film magnetic layer 30 is formed so that the planar shape thereof falls within a rectangle of which the dimension in the width direction (the X direction in the figure) is about 10 μm and the dimension in the height direction (the Y direction in the figure) is about 20 μm.

Figure 3:
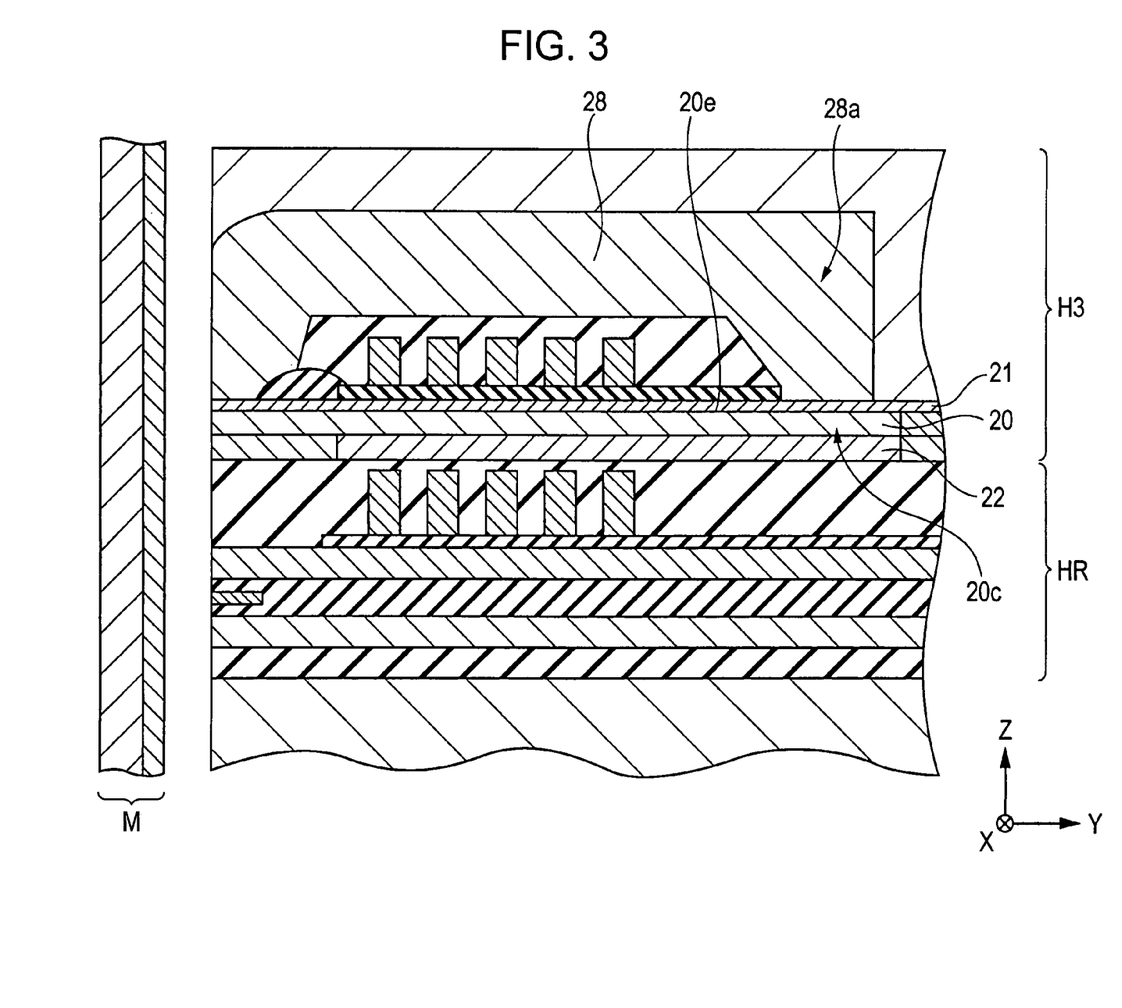
FIG. 3 is a partial cross-sectional view of a composite magnetic head according to a third embodiment.

According to a perpendicular magnetic recording head H3 of a third embodiment shown in FIG. 3, an auxiliary yoke layer 22 is provided on the bottom face (end face being disposed at the reading side) of a main magnetic pole layer 20 and a spacer layer 21 is provided on the top face (end face being disposed at the trailing side) of the main magnetic pole layer 20. In the embodiment shown in FIG. 3, unlike the embodiments shown in FIGS. 1 and 2, only the spacer layer 21 is provided between a rear end 28a of a return yoke layer 28 and a rear end 20c of the main magnetic pole layer 20, and the auxiliary yoke layer 22 is not provided therebetween.

During recording, the main magnetic pole layer 20 receives a recording magnetic field from the rear end 28a. However, the area of the rear end 28a of the return yoke layer 28 facing the main magnetic pole layer 20 is small, for example, only the area shown by the dotted line in FIG. 4. It is believed that the attenuation of the recording magnetic field caused by the formation of the spacer layer 21 is easily increased, compared with the embodiments shown in FIGS. 1 and 2.

In addition, as shown in FIGS. 1 and 2, when the auxiliary yoke layer 22 is provided on the main magnetic pole layer 20, the auxiliary yoke layer 22 can be provided behind (at the height side) the leading end 28b of the return yoke layer 28. This structure can easily connect the lower coil layers 18 to the upper coil layers 24 compared with the embodiment shown in FIG. 3. Since the coil length of the whole coil includes the lower coil layers 18 and the upper coil layers 24 can be decreased, the coil resistance can be decreased.

However, in the embodiment shown in FIG. 3, at all times except during recording, a disturbance magnetic field absorbed by the return yoke layer 28 does not enter the main magnetic pole layer 20 through the spacer layer 21. The adverse effects such as a deletion of recorded data caused by the disturbance magnetic field can be suppressed as compared with known structures.

In the embodiment shown in FIG. 3, the spacer layer 21 may be disposed at least between the rear end 28a of the return yoke layer 28 and the rear end 20c of the main magnetic pole layer 20. In the embodiments shown in FIGS. 1 and 2 in which the auxiliary yoke layer 22 is provided between the main magnetic pole layer 20 and the return yoke layer 28, the spacer layer 21 may be disposed at least between the auxiliary yoke layer 22 and the main magnetic pole layer 20.

The auxiliary yoke layer 22 is not an essential layer. For example, the embodiments shown in FIGS. 1 and 2 also include embodiments in which the auxiliary yoke layer 22 is not provided. However, the formation of the auxiliary yoke layer 22 increases the size of a magnetic layer area facing the main magnetic pole layer 20, and thus the recording magnetic field can be supplied to the main magnetic pole layer 20 over a wider area. In view of maintaining a satisfactory recording property, the formation of the auxiliary yoke layer 22 is necessary.

What is claimed is:

1. A perpendicular magnetic recording head comprising:
   a main magnetic pole layer comprising a magnetic material;
   a return yoke layer comprising a magnetic material that faces the main magnetic pole layer with a nonmagnetic gap layer provided therebetween, the gap layer being provided at the surface of the magnetic recording head facing a recording medium and at the trailing side of the main magnetic pole layer;
   coil layers that provide the main magnetic pole layer and the return yoke layer with a recording magnetic field; and
   an auxiliary yoke layer provided between the main magnetic pole layer and the return yoke layer,
   wherein a nonmagnetic spacer layer is provided at least between a rear end of the main magnetic pole layer and a rear end of the return yoke layer, the rear ends being disposed away from the surface of the magnetic recording head facing the recording medium in a height direction; and
   wherein a rear end of the auxiliary yoke layer is connected to the rear end of the return yoke layer, and the spacer layer is provided between the auxiliary yoke layer and the main magnetic pole layer.

2. The perpendicular magnetic recording head according to claim 1, further comprising:
   a thin-film magnetic layer comprising a magnetic material and having a thickness smaller than that of the main magnetic pole layer,
   wherein the thin-film magnetic layer is connected to the return yoke layer at the surface of the magnetic recording head facing the recording medium and at the rear end of the return yoke layer, and
   the spacer layer is provided between the thin-film magnetic layer and the main magnetic pole layer.

3. The perpendicular magnetic recording head according to claim 2, wherein the thin-film magnetic layer comprises a magnetic material having a saturation magnetic flux density lower than that of the main magnetic pole layer.

4. A perpendicular magnetic recording head, comprising:
   a main magnetic pole layer comprising a magnetic material;
   a return yoke layer comprising a magnetic material that faces the main magnetic pole layer with a nonmagnetic gap layer provided therebetween, the gap layer being provided at the surface of the magnetic recording head facing a recording medium and at the trailing side of the main magnetic pole layer;

coil layers that provide the main magnetic pole layer and the return yoke layer with a recording magnetic field; and a thin-film magnetic layer comprising a magnetic material and having a thickness smaller than that of the main magnetic pole layer, wherein a nonmagnetic spacer layer is provided at least between a rear end of the main magnetic pole layer and a rear end of the return yoke layer, the rear ends being disposed away from the surface of the magnetic recording head that faces the recording medium in a height direction; and wherein the thin-film magnetic layer is connected to the return yoke layer at the surface of the magnetic recording head that faces the recording medium and at a rear end of the return yoke layer, and the spacer layer is provided between the thin-film magnetic layer and the main magnetic pole layer.

5. The perpendicular magnetic recording head according to claim 4, wherein the thin-film magnetic layer comprises a magnetic material having a saturation magnetic flux density lower than that of the main magnetic pole layer.

6. A perpendicular magnetic recording head comprising:
a main magnetic pole layer comprising a magnetic material;
a return yoke layer comprising a magnetic material that faces the main magnetic pole layer with a nonmagnetic gap layer provided therebetween, the gap layer being provided at the surface of the magnetic recording head facing a recording medium and at the trailing side of the main magnetic pole layer;

an auxiliary yoke layer provided between the main magnetic pole layer and the return yoke layer, a rear end of the auxiliary yoke layer being connected to a rear end of the return yoke layer; and coil layers for providing the main magnetic pole layer and the return yoke layer with a recording magnetic field, wherein a nonmagnetic spacer layer is provided at least between the rear end of the auxiliary yoke layer and a rear end of the main magnetic pole layer, the rear ends being disposed away from the surface of the magnetic recording head facing the recording medium in a height direction, wherein the spacer layer extends to the surface of the magnetic recording head facing the recording medium and also functions as the gap layer, and wherein the thickness of the spacer layer between the auxiliary yoke layer and the main magnetic pole layer is greater than the thickness of the spacer layer disposed between the return yoke layer and the main magnetic pole layer and proximate to the surface of the magnetic recording head facing the recording medium.

* * * * *